United States Patent
Oigawa

[11] Patent Number: 5,164,626
[45] Date of Patent: Nov. 17, 1992

[54] COIL ELEMENT AND HEAT GENERATING MOTOR ASSEMBLED THEREFROM

[75] Inventor: Senji Oigawa, Matsumoto, Japan

[73] Assignees: Fujikura Ltd., Tokyo; Senji Oigawa, Matsumoto, both of Japan

[21] Appl. No.: 714,236

[22] Filed: Jun. 12, 1991

[30] Foreign Application Priority Data

Jun. 14, 1990 [JP] Japan .................. 2-156441
Nov. 30, 1990 [JP] Japan .................. 2-341263

[51] Int. Cl.⁵ .................. H02K 3/24; H02K 9/06; H01F 27/08
[52] U.S. Cl. .................. 310/208; 310/64; 310/259; 336/61
[58] Field of Search .................. 310/195, 208, 254, 256, 310/259, 52, 64, 65; 392/497, 500, 501, 446, 447; 219/540; 338/267, 270, 301, 302; 336/55, 61

[56] References Cited

U.S. PATENT DOCUMENTS

| | | | |
|---|---|---|---|
| 714,232 | 11/1902 | Pichler | 336/61 |
| 1,425,968 | 8/1922 | Holmes | 336/61 |
| 1,861,869 | 6/1932 | Long | 336/61 |
| 2,947,957 | 8/1960 | Spindler | 336/61 |
| 3,341,723 | 9/1967 | Tourtellot | 310/68 |
| 3,534,197 | 10/1970 | Burnett | 219/10.49 |
| 3,571,818 | 3/1971 | Jacuzzi | 4/180 |
| 3,651,240 | 3/1972 | Kirkpatrick | 13/22 |
| 3,835,339 | 9/1974 | Laronze | 310/13 |
| 3,868,766 | 3/1975 | Gramlich et al. | 29/596 |
| 4,089,642 | 5/1978 | Briggs et al. | 432/222 |
| 4,236,139 | 11/1980 | Haglund | 338/302 |
| 4,481,407 | 11/1984 | Stokes et al. | 219/457 |
| 4,563,571 | 1/1986 | Koga et al. | 219/299 |
| 4,563,606 | 1/1986 | Fukasawa et al. | 310/208 |
| 4,617,456 | 10/1986 | Richards et al. | 219/523 |
| 4,687,961 | 8/1987 | Horber | 310/186 |
| 4,724,345 | 2/1988 | Elton et al. | 310/45 |
| 4,740,670 | 4/1988 | You | 219/370 |
| 4,782,254 | 11/1988 | Kreuzer et al. | 310/45 |
| 4,801,776 | 1/1989 | Cornell | 219/10.55 B |
| 4,882,514 | 11/1989 | Brynsvold et al. | 310/208 |
| 4,883,982 | 11/1989 | Forbes et al. | 310/62 |
| 4,897,626 | 1/1990 | Fitter | 336/61 |
| 4,908,535 | 3/1990 | Kreuzer et al. | 310/45 |
| 4,956,626 | 9/1990 | Hoppe et al. | 336/60 |

FOREIGN PATENT DOCUMENTS

| | | |
|---|---|---|
| 0124809 | 11/1984 | European Pat. Off. |
| 224169 | 9/1909 | Fed. Rep. of Germany |
| 1806721 | 5/1970 | Fed. Rep. of Germany |
| 2103448 | 8/1972 | Fed. Rep. of Germany |
| 3129715 | 6/1983 | Fed. Rep. of Germany |
| 3836415 | 5/1989 | Fed. Rep. of Germany |
| 57-79604 | 5/1982 | Japan |
| 60-62101 | 4/1985 | Japan |
| WO9008390 | 7/1990 | PCT Int'l Appl. |

Primary Examiner—Steven L. Stephan
Assistant Examiner—D. R. Haszko
Attorney, Agent, or Firm—Oblon, Spivak, McClelland, Maier & Neustadt

[57] ABSTRACT

A heat generating motor capable of efficiently producing a high flow rate current of a fluid heated to a high temperature, and produced minimal magnetic vibration, including component coil blocks, coil elements and hardened coils which provide efficient and simultaneous generation of heat and an intense magnetic field. The hardened coil includes multiple loops of insulated electrically conductive wire wound so as to form a flattened hollow disk shaped configuration which is then hardened to preserve its form. The insulated electrically conductive wire is made of a conductive core having a conductance ratio of 5 to 95% and a heat resistant electrically insulating layer surrounding the conductive core. The coil element includes one or more hardened coils which are sandwiched tightly between a pair of radiating plates formed from magnetic material, with an insulating layer intervening between each surface of a given hardened coil and respective adjacent radiating plate. The coil blocks include multiple coil elements, interconnected by means of a heat resistant electrically insulating hollow core member which passes through the hollow central section of each component coil element.

14 Claims, 6 Drawing Sheets

COIL ELEMENT AND HEAT GENERATING MOTOR ASSEMBLED THEREFROM

BACKGROUND OF THE INVENTION

1. Field of the Invention

The present invention relates to electrical motors, and in particular, to electrical motors used to generate heated currents of gaseous or liquid fluids.

2. Prior Art

Electrical motors are conventionally known wherein the motor coil windings are employed as a source of heat in addition to their ordinary function in the electrical motor, and wherein a fan is fitted on the central rotating axis of the electrical motor, thereby creating a current of warm air by blowing air over the heated motor coils. Examples of such devices include Japanese Patent Application, First Publication No. Sho-49-88142, Japanese Patent Application, First Publication No. Sho-616-35132 and WO900474.

In that these conventional devices consist essentially of a fan mounted on the shaft of a conventional motor, however, they retain the limitations of the conventional motor incorporated therein. Namely, when design changes are implement so as to increase heat generation by the motor coils, mechanical efficiency of the motor decreases correspondingly. When design changes are implemented so as to increase the mechanical output of the motor, heat generation by the motor coils decrease correspondingly. Consequently, conventional devices of this type are generally not suitable for applications wherein the generation of large volumes of air heated to a high temperature is required.

Additionally, in order to provide for a sufficiently high heat output, the heat generating coil winding elements may reach temperatures ranging from 500° to 700° C. Such temperatures, however, result in a shortened service life for the heat generating coil winding elements, and hence, for the electrical motor itself.

Moreover, when increased current flow through the coil windings is employed in order to enhance heat output, magnetically induced vibration of the coil windings occurs, thereby resulting in generation of objectionable levels of hum and other types of noise, as well as decreased service life for resistance elements due to rubbing of adjacent elements against one another as they vibrate.

SUMMARY OF THE INVENTION

In consideration of the above, the object of the present invention is to provide a heat generating electric motor applicable to hot air blowers, water heaters and the like, which is capable of efficiently producing a high flow rate current of a fluid heated to a high temperature.

Additionally, it is the object of the present invention to provide a coil block which forms the motor coil windings of the heat generating electric motor of the present invention, and which also can be employed in various other devices wherein the efficient and simultaneous generation of heat and an intense magnetic field is desirable. It is furthermore the object of the present invention to provide a characteristic coil element, multiple instances of which are incorporated in the above mentioned coil block, and to provide a characteristic coil, one or more of which are incorporated in each of the above mentioned coil elements.

So as to achieve the above described object, the present invention provides a hardened coil suitable for use in devices wherein simultaneous generation of heat and a magnetic field is desirable, the hardened coil comprised of multiple loops of insulated electrically conductive wire wound so as to form a flattened hollow disk shaped configuration which is then hardened to preserve its form, the insulated electrically conductive wire consisting of a conductive core having a conductance ratio of 5 to 95% and a heat resistant electrically insulating layer surrounding the conductive core.

Additionally, the present invention provides a coil element suitable for use in devices wherein simultaneous generation of heat and a magnetic field is desirable, the coil element consisting of one or more of the above described hardened coils, sandwiched tightly between a pair of radiating plates formed from magnetic material, with a insulating layer intervening between each surface of a given hardened coil and a respective adjacent radiating plate.

Moreover, the present invention provides a coil block suitable for use in devices wherein simultaneous generation of heat and a magnetic field is desirable, the coil block consisting of a plurality of the above described coil elements, aligned in a substantially parallel configuration, and interconnected by means of a heat resistant electrically insulating hollow core member which passes through the hollow central section of each component coil element.

The present invention furthermore provides a hot air blower which incorporates a heat generating electric motor including the above described coil block for its stator coil windings and a fan mounted on the motor shaft. Also provided is a water heater which incorporates the heat generating electric motor of the present invention within a water tight capsule and a propeller mounted on the motor shaft which extends external to the water tight capsule.

With the coil of the present invention, a significant amount of heat can be generated, while at the same time, heat induced deterioration of the insulating layer surrounding the coil windings is minimized.

With the coil element of the present invention which incorporates the above described coil, heat is efficiently generated and rapidly dissipated and dispersed so as to eliminate overheating of the device, while simultaneously, a strong magnetic field is generated by concentrating the magnetic flux produced by component coils thereof. At the same time, magnetic vibration of coil windings is minimized, as is consequent noise and vibration induced coil damage.

With the coil block of the present invention, an optional number of the above described coil elements can be employed in unison, making it possible to achieve a desired balance of heat and magnetic field generation, and when employed in the heat generating motor of the present invention, efficient generation of heat and highly effective forced convection of a heated fluid can be simultaneously achieved.

When the heat generating motor of the present invention is used as a hot air blower or water heater, the need for separate heating elements is eliminated, thereby limiting the part count, expense and complexity of the device and facilitating miniaturization, while at the same time, enhancing efficiency of heat generation and production of a heated fluid current.

DETAILED DESCRIPTION OF THE PREFERRED EMBODIMENTS

In the following, the preferred embodiments of the present invention will be described in detail with reference to the appended drawings.

Figure 1:
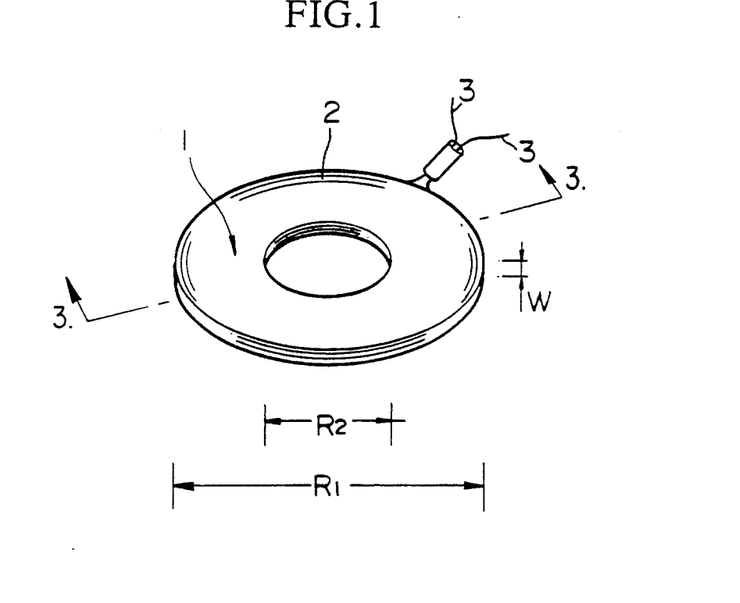
FIG. 1 is an oblique view showing one example of a coil in accordance with the present invention.

FIG. 1 shows one example of a coil in accordance with the present invention. As shown in the drawing, this coil 1 consists of insulated wire 2 wound around a hollow core in a disk-like configuration having a circular circumference and a relatively small height W compared with the diameter of the coil 1. Electrically conductive wire covered with a heat resistant electrically insulating layer is employed for insulated wire 2.

The electrically conductive wire incorporated in insulated wire 2 should have a conductance ratio within the range of from 5 to 95% (ICAS). The conductance ratio or conductive ratio refers to the standard known as the international annealed copper standard (IACS) established by the International Electrical Committee (IEC). The conductance ratio is obtained by the formula $\sigma_0 \times 100$ 1, in which $\sigma_0$ is the specific resistance of annealed copper at 20° C., or 1.724 $\mu\Omega$cm and $\sigma$ is the specific resistance of the wire under consideration at 20° C. If the conductance ratio of this wire is greater than 95% as is the case with ordinary nickel plated copper wire, passing very high electrically current, the wire is melted to cut. Conversely, if the conductance ratio of the wire is less than 5% as with conventional nichrome wire, the magnetic field and heat will not be generated simultaneously. It is of course desirable that the wire employed be resistant to oxidation or other damage at high temperatures. Suitable conducting materials for this wire include copper cladded steel wire, nickel, stainless steel cladded copper wire, nickel cladded copper wire (i.e., which has a thicker nickel layer as compared with ordinary nickel plated copper wire, such that the conductance ratio is less than ordinary nickel plated copper wire) aluminum alloy, copper alloy, gold, platinum and carbon fiber. The electrically conductive wire should have a diameter on the order of 0.2 to 3 mm, although it is not so limited.

For the insulating layer of the insulated wire 2, suitable examples thereof include layers formed by applying a dispersion of ceramic powder such as alumina or magnesia mixed with a binder consisting of thermal hardening resin such as methyl silicone or methyl phenyl silicone over the central conducting wire, and then sintering at high temperature and moreover applying heat-resistant varnish paint thereon then sintering at high temperature either before or after winding the coated wire into a coil. Such insulating layers demonstrate excellent resistance to deterioration at high temperatures. The thickness of the insulating layer should be on the order of 20 to 50 $\mu$m, although dimensions outside of this range may be acceptable.

For the coil wound from insulated wire 2 as pictured in FIG. 1, the outer diameter $R_1$ thereof is preferably on the order of 25 to 300 mm, and the inner diameter $R_2$ preferably on the order of 10 to 100 mm and ratio of $R_1$ and $R_2$ ($R_1/R_2$) is preferably about 3. The height W of the wound coil should be 20 mm or less, preferably 10 mm or less, and more preferably on the order of 1 to 5 mm. Ideally, the coil should be wound so as to form 20 to 750 concentric layers, with 2 to 70 turns per layer, thereby ordinarily yielding a total number of turns in the range of 40 to 1500. Leads 3, 3 shown in FIG. 1 are leaded out from the most outer layer of the coil. Moreover, coil 1 is preferably wound in regular winding (well-ordered).

With coil 1 of the present invention, each turn of the coil is mutually adherent to adjacent loops of the insulated wire 2, whereby the finished coil assumes a semirigid consistency which serves to preserve the shape and wound configuration of the coil after fabrication thereof. This may be accomplished by dipping the wound coil 1 in a heat resistant resin composition such as polyimide, followed by hardening the resin material thus applied. Alternately, a self adhering heat resistant layer can be applied over the insulated wire 2, after which the coil 1 thus fabricated is heat treated to thereby harden the self adhering layer.

As thus described, coil 1 is wound so as to form a circular hollow disk-like configuration. The present invention is not so limited, however, and coil 1 can be suitably wound in some other configuration, for example, as a square or rectangular hollow disk such as the coil 1 shown in FIG. 2. Other geometrical configurations are also acceptable.

Figure 2:
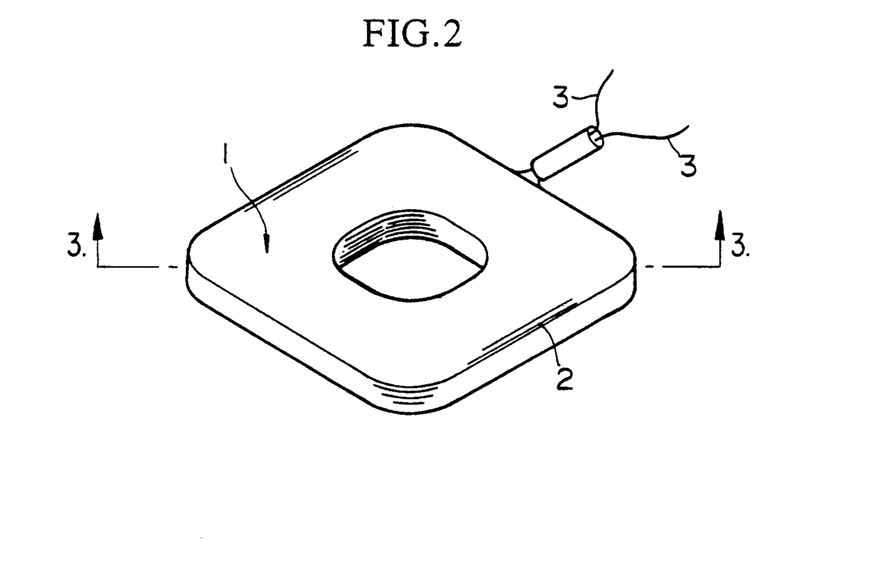
FIG. 2 is an oblique view showing another example of a coil in accordance with the present invention.
Figure 3:
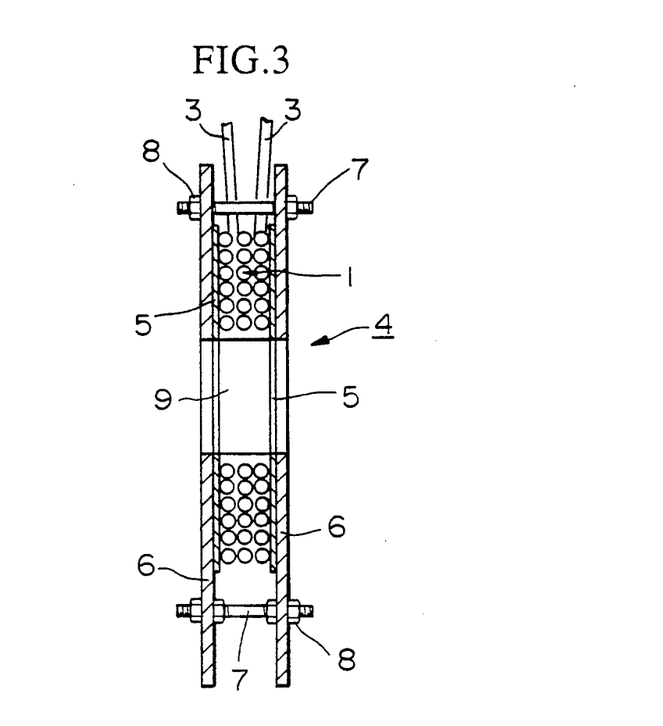
FIG. 3 is a cross-sectional view taken along line III—III shown in FIGS. 1 and 2 and showing one example of a coil element in accordance with the present invention.

In FIG. 3, one example of a coil element in accordance with the present invention is shown in cross-section. In the pictured coil element 4, a coil 1 such as that shown in FIG. 1 or FIG. 2 is sandwiched between two radiating plates 6, 6, each of which is fabricated from a magnetic material, with a insulating layer 5 intervening on either side between the coil 1 and the corresponding radiating plate 6. The entire assembly is held tightly together by multiple bolts 7 and corresponding nuts 8, the bolts 7 penetrating only radiating plates 6, 6 via through-holes drilled therein. An opening is formed in each of insulating layers 5, 5 and radiating plates 6, 6, each of which corresponds in shape and position to the hollow core of coil 1 sandwiched therebetween. During assembly of the coil element 4, each of these openings and the hollow core of coil 1 are aligned so as to overlie one another.

The material from which the insulating layers 5, 5 are formed should be an electrical insulating material which is able to withstand high temperatures, and has flexible property. Suitable examples of materials therefor include mica, glass cloth, glass mat and asbestos mat. Ideally, the thickness of insulating layers 5, 5 is on the order of 0.1 to 1 mm.

For radiating plates 6, 6, suitable examples of materials therefor include magnetic metals such as iron, silicon steel. Ordinarily, however, silicon steel which has been subjected to anti-oxidizing processing such as zinc or silver plating is used. If a non-magnetic material such as aluminum is used, the coercivity of the magnetic field generated by such a coil element will be unacceptably low for use in electric motors or the like. The radiating plates 6, 6 should preferably have a thickness on the order of 0.3 to 1 mm, and have a surface area of on the order of 20 to 3000 cm$^2$, and have 1.5 times as area as surface area of the coil 1.

Figure 4:
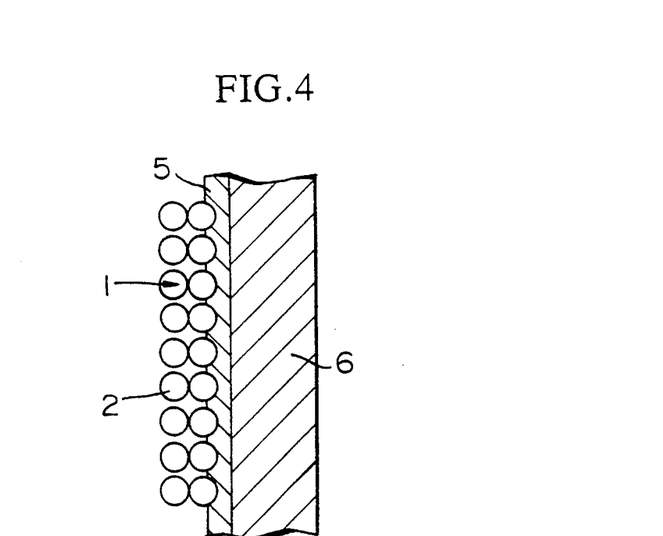
FIG. 4 is a magnified view showing a portion of the coil element shown in FIG. 3.

It is important that the coil 1 of coil element 4 be tightly held between radiating plates 6, 6 so that the insulated wire 2 which makes of the windings of coil 1 indents into the insulating layers 5, 5 intervening between each side of coil 1 and the corresponding radiating plate 6, as is shown in FIG. 4 which is a magnified view of a portion of coil element 4. By so doing maximal transfer of heat from insulated wire 2 to radiating plates 6, 6 is achieved, thereby enhancing heat output from any device which incorporates such a coil element 4, and also prolonging the service life of insulated wire 2 by minimizing dramatic changes in temperature therein. Additionally, by suitably distributing the multiple bolts 7 and suitably tightening each respective nut 8 thereon, magnetic vibration of insulated wire 2, and hence noise and damage due to rubbing of adjacent turns of insulated wire 2 against one another can be minimized and damage of insulation layer is decreased.

Figure 5:
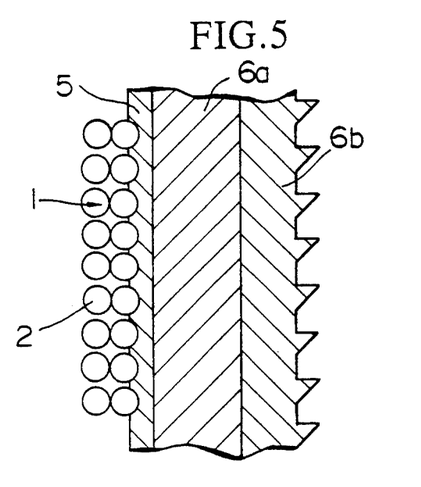
FIG. 5 is a magnified view showing a variation of a component employed in the coil element shown in FIGS. 3 and 4.

FIG. 5 illustrates another example of the radiating plates 6, 6 which are employed in coil element 4. In this case, the radiating plates 6, 6 have a bilaminar structure consisting of a radiating base plate 6a made of a magnetic material such as steel, with an overlying highly thermal conductive layer made up of an aluminum sheet 6b, the outer surface of which is corrugated to increase the surface area thereof and thus further enhance heat dissipation.

With the structure of coil element 4 as thus described, because radiating plates 6, 6 are formed from a material which is a good thermal conductor, heat readily dissipates from within coil 1, and efficiently radiates outward, thus creating an effective and efficient heat source. Furthermore, because radiating plates 6, 6 are formed from a magnetic material, they act to form a type of magnetic circuit whereby an intense magnetic field is concentrated at the hollow core of coil 1 which can be employed to drive the rotating shaft of an electric motor with great force. Consequently, the design of coil element 4 of the present invention makes it possible to construct a heat generating electric motor which simultaneously permits powerful driving of a fan mounted on the motor shaft, and hence increased flow of the liquid or gaseous medium in which the motor is immersed, together with generation of considerable heat from the motor coils. By varying the number of concentric layers of insulated wire 2 in coil 1, the number of turns per layer, and the total number of turns, the power of an electric motor incorporating the coil element 4 can be adjusted, as can the balance between generation of heat and mechanical energy so as to best suit the application for which the heat generating electric motor is employed.

Figure 6:
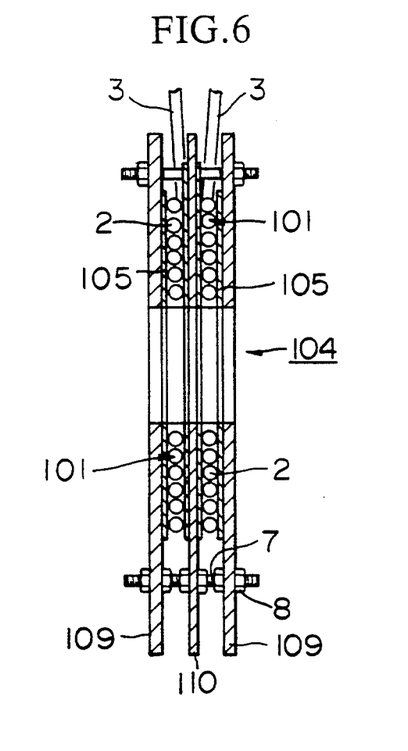
FIG. 6 is a cross-sectional view of another embodiment of the coil element FIG. 5 of the present invention.

FIG. 6 shows another example of a coil element in accordance with the present invention. The coil element 104 shown in FIG. 6 differs from that shown in FIG. 3 in that two coils 101, 101 are incorporated sided by side with an intervening intermediate radiating plate 110 made from a magnetic material sandwiched therebetween. On either side of intermediate radiating plate 109, a insulating layer 105 is applied, these insulating layers 105 intervening between the respective surface of intermediate radiating plate 109 and the corresponding coil 101.

The introduction of the intermediate radiating plate 110 in the coil element 104 shown in FIG. 6 permits even more efficient dissipation and radiation of heat, and allows concentration of an extremely intense magnetic field at the central portion thereof, in this way making it possible to construct an extremely powerful motor incorporating such a coil element 104. Moreover, it has also been found that the design of this example results in even greater reduction of magnetic vibration, and consequently, quieter operation and less damage to insulated wire 2 windings in the coils 101, 101 induced by magnetic vibration.

Figure 7:
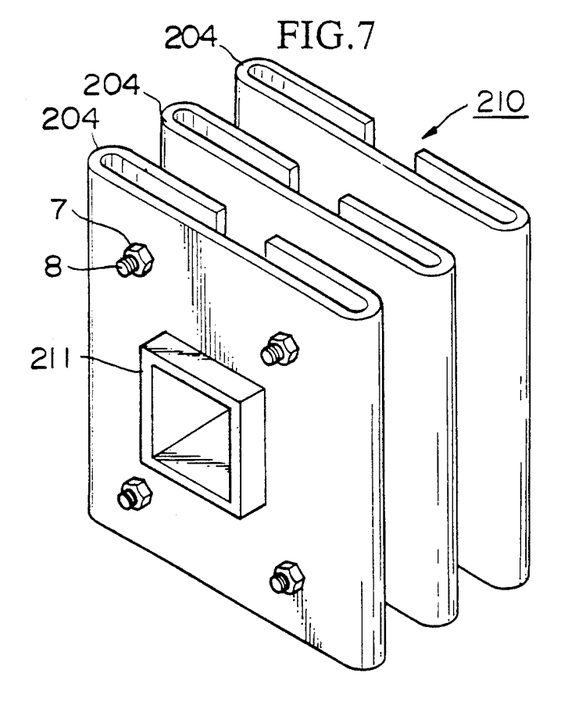
FIG. 7 is a perspective view showing one example of a coil block in accordance with the present invention.

FIG. 7 shows a coil block 210 in accordance with the present invention which incorporates a plurality of coil elements 204. For these coil elements 204, coil element 4 shown in FIG. 3 and/or coil element 104 shown in FIG. 6 can be used. The coil elements 204 are stacked in a superimposed parallel relationship with respect to one another. A hollow core member 211 passes through the aligned central hollow sections of each component coil element 204, thereby supporting the array of coil elements 204. Hollow core member 211 should be made from an electrical insulating material which is capable of withstanding high temperatures, for example, mica covered metal pipe and the like.

In consideration of demand for heat generation, magnetic field requirements, and maximization of service life of the individual coil elements 204 making up the coil block 210, ordinarily on the order of five coil elements 204 are employed in a single coil block 210. The coil elements 204 may be connected in series or in parallel, depending on demand for heat generation and other factors. Each coil element 204 is separated from any adjacent coil element 204 by a gap of on the order of 1 to 10 mm, although a smaller gap can be used if the radiating plates 206, 206 in each coil element 204 have an increased surface area so as to more efficiently dissipate heat.

Figure 8:
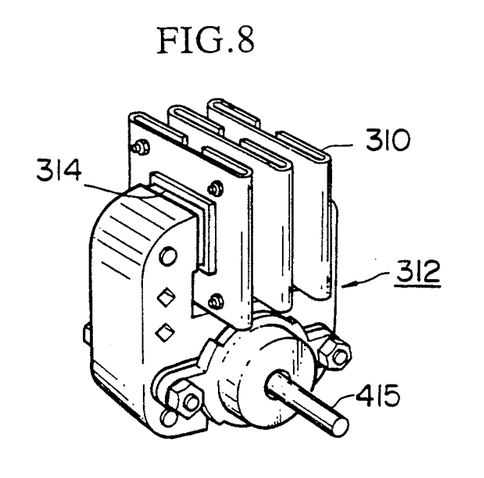
FIG. 8 is an oblique view showing one example of a heat generating motor in accordance with the present invention.

FIG. 8 shows one example of a heat generating motor in accordance with the present invention. The above described coil block 310 is employed for stator coil windings in the pictured heat generating motor 312 which is a shading coil motor, a type of induction motor. With this heat generating motor 312, the laminated iron motor core 314 passes through the hollow core formed in the coil block 310.

Figure 9:
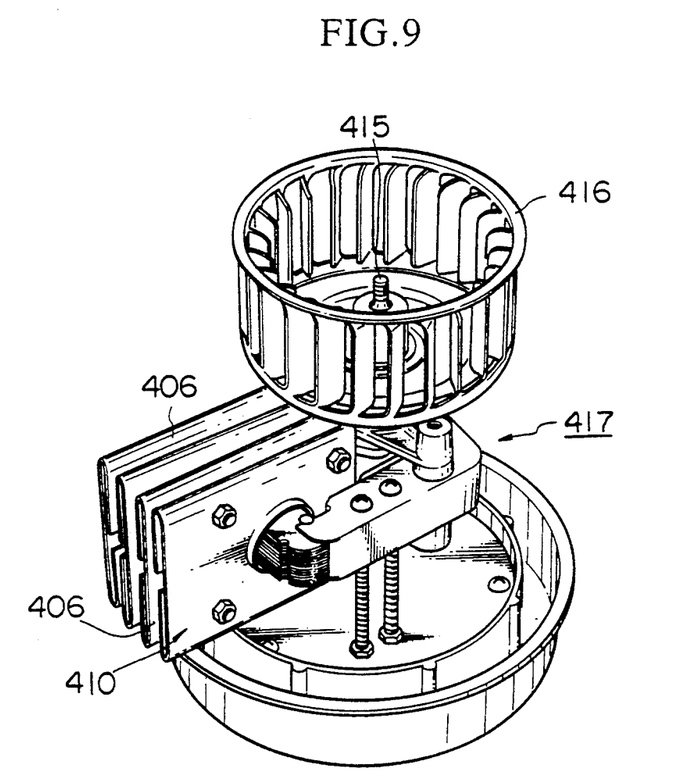
FIG. 9 is an oblique view showing a inside construction of one example of a hot air blower in accordance with the present invention.

In FIG. 9, another example of a heat generating motor in accordance with the present invention is shown as a component of a hot air blower 417, wherein coil block 410 acts to generate a rotating magnetic field. In the case of this heat generating motor 412, coil block 410 functions as both primary motor coil windings and as a heat generating unit.

By attaching squirrel cage fan 416 to the rotary shaft 415 of heat generating motor 412 as shown in FIG. 9, air can be forced over the radiating plates 406 of coil block 410, thereby generating a stream of heated air, and thus functioning as a hot air blower. Because the heat generating motor 412 also functions as a heating unit, there is no need for a separate heating unit such as nichrome wire or a ceramic heater as are used in conventional hot air blowers. In this way, the part count, cost and complexity of the device can be lowered, miniaturization is facilitated, and at the same time, efficiency of heat generation is enhanced, thereby decreasing power consumption requirements. If it is desirable to provide increased air flow at a lower temperature, this can be readily accomplished by designing heat generating motor 412 such that the torque applied to shaft 415 is increased and with a coil block 410 having somewhat elongated radiating plates 406 so as to provide for increased heat dissipation.

Figure 10:
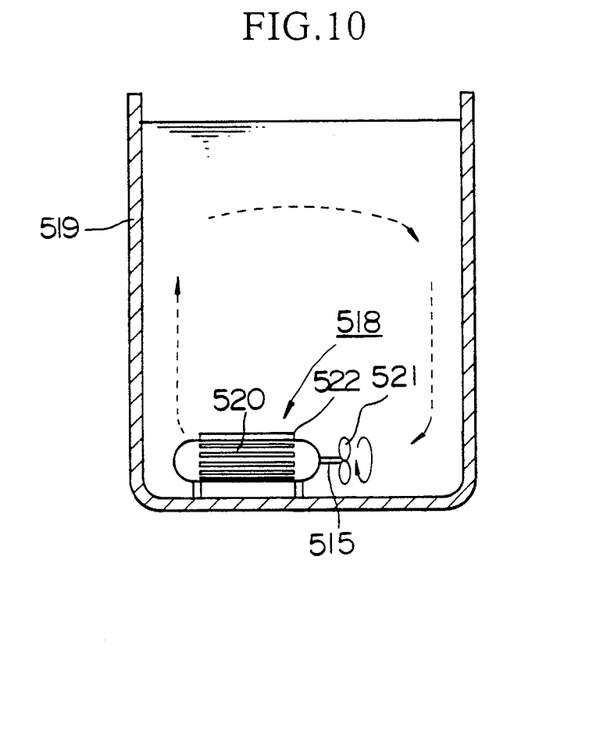
FIG. 10 is a schematic view showing one example of a water heater in accordance with the present invention.

FIG. 10 is a schematic drawing showing a water heater 518 which has been implemented using a heat generating motor sealed in a water tight capsule 520 with heat-radiating fins 522, with only the rotary shaft 515 of the heat generating motor and the propeller 521 attached thereon extending beyond the water tight capsule 520. As is shown in FIG. 10, capsule 520 and the heat generating motor enclosed therein are situated at the bottom of a water tank 519, entirely submerged in water. Water heater 518 is designed such that heat produced by the heat generating motor is readily transmitted through the fins 522 of the capsule 520 in the surrounding water. The spinning action of propeller 521 then acts to effect mixing, and thereby create a uniform temperature throughout the water in water tank 519. Because heat propagates through water much faster than air, if desired, the heat generating motor of water heater 518 can be designed so as to output a greater amount of heat and so that a relatively smaller torque is applied to rotary shaft 515.

Figure 11:
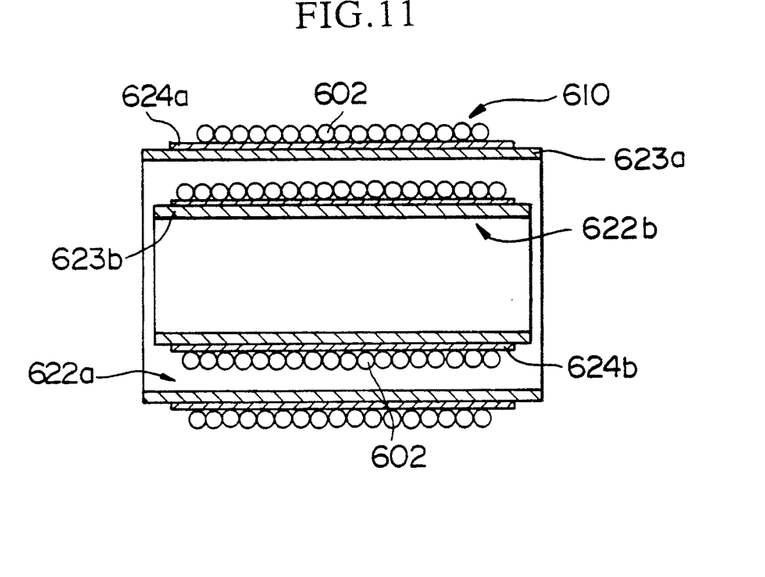
FIG. 11 is a cross-sectional view showing another example of a coil element and coil block in accordance with the present invention.

In FIG. 11, another example of a coil block in accordance with the present invention is shown. As seen from the drawing, this coil block 610 consists of two concentric tubular coil elements, coil element 622a and coil element 622b, such that coil element 622a lies within coil element 622b. Each coil element 622a, coil element 622b consists of a radiating pipe 623a, 623b, the outer surface of which is surrounded with a respective insulating layer 624a, 624b, over each of which, a respective single winding layer of tightly wound insulated wire 602 is provided. After coil element 622a and coil element 622b have been thus fabricated, the smaller diameter coil element 622a is inserted within coil element 622b, with a concentric gap formed therebetween. Air forced through the gap between coil element 622a is inserted within coil element 622b acts to dissipate heat therefrom, and furthermore generates a stream of heated air. By causing the laminated iron motor core of an electric motor to pass through the hollow core formed within coil element 622b, coil block 610 functions as motor coil windings for a heat generating motor. Although as described, two concentric coil elements, coil element 622a and coil element 622b are provided, this invention is not so limited, such that three or more such concentric coil elements can be employed.

In the preceding, the coil, coil element and coil block of the present invention have generally been described in the context of heat generating motors. The invention is not so limited, however, and these devices can be employed in any situation in which the simultaneous generation of heat and a magnetic field is desired.

EXPERIMENTAL EXAMPLE 1

A 7 m length of insulated wire (Fuji-Thermo, Fujikura Ltd.,) with a central conductor of 2 $\mu$m nickel plated copper cladded steel wire having a diameter of 0.4 mm and conductance ratio of 40%, covered with a 25 $\mu$m thick ceramic insulating layer and a 10 $\mu$m thick polyimide layer as a protect layer was wound into a disk-shaped coil having an outer diameter of 40 mm, inner diameter of 22 mm and height of 1.6 mm, after which the coil thus wound was heat treated at 450° C. for 3 minutes.

A 0.5 mm thick, 50 mm $\times$ 70 mm iron plate with a 20 mm diameter central opening was placed at either side of the coil thus wound, with a 0.3 mm thick mica layer intervening between the coil and iron plate on each side. This assembly was then bolted together using nuts and bolts, thereby fabricating a coil element as shown in FIG. 3.

Using the coil element thus fabricated, a 22.9 V, 60 Hz electrical potential was applied thereto, whereupon a current flow of 3.4 A in the coil and a magnetic field intensity of about 100 gauss at the hollow core of the coil element were measured. After 1 minute of application of the electrical potential, the temperature of the iron plates was 160° C.

COMPARATIVE EXAMPLE 1

A coil element identical to that of Experimental Example 1 above was constructed, except that in place of the two iron plate 1 mm thick aluminum alloy plates were employed.

Using the coil element thus fabricated, a 22.9 V, 60 Hz electrical potential was applied thereto, whereupon a current flow of 3.7 A in the coil and a magnetic field intensity of about 85 gauss at the hollow core of the coil element were measured. After 1 minute of application of the electrical potential, the temperature of the aluminum alloy plates was 120° C.

COMPARATIVE EXAMPLE 2

A coil element identical to that of Experimental Example 1 above was constructed, except that 35 $\mu$m thick ceramic coated nickel plated soft copper wire having a conductance ratio of 99% with 0.3 mm diameter was used for the coil windings.

Using the coil element thus fabricated, a 22.9 V, 60 Hz electrical potential was applied thereto, the wire was melted to cut after 1 minute of application of the electrical potential.

COMPARATIVE EXAMPLE 3

A coil element identical to that of Experimental Example 1 above was constructed, except that 0.3 mm diameter nichrome wire with a conductance ratio of 1%, covered with a 35 $\mu$m thick ceramic insulating layer was used for the coil windings.

Using the coil element thus fabricated, a 25 V, 60 Hz electrical potential was applied thereto, whereupon a current flow of 0.17 A in the coil and a magnetic field intensity of 17.7 gauss at the hollow core of the coil element were measured. After 1 min of application of the electrical potential, the temperature of the iron plates was not changed.

EXPERIMENTAL EXAMPLE 2

A coil block was fabricated using four of the coil elements prepared in Experimental Example 1, with a 21 mm outer diameter, 19 mm inner diameter, 40 mm long steel pipe covered with a 0.3 mm thick mica for the hollow core member.

The four component coil elements of the coil block were then electrically connected together in series.

Using the coil block thus fabricated, a 100 V, 60 Hz electrical potential was applied thereto, whereupon a current flow of 3.8 A in the coil and a magnetic field intensity of 110 gauss at the hollow core of the coil block were measured. After 1 minute of application of the electrical potential, the temperature of the iron plates was 160° C.

EXPERIMENTAL EXAMPLE 3

A coil block was fabricated using four of the coil elements prepared in Experimental Example 1, with a 21 mm outer diameter, 19 mm inner diameter, 40 mm long steel pipe covered with a 0.3 mm thick mica for the hollow core member.

The four component coil elements of the coil block were then electrically connected together in series.

Using the coil block thus fabricated, a 100 V, 60 Hz electrical potential was applied thereto, whereupon a current flow of 3.6 A in the coil and a magnetic field intensity of 180 gauss at the hollow core of the coil block were measured. After 1 minute of application of the electrical potential, the temperature of the iron plates was 160° C.

EXPERIMENTAL EXAMPLE 4

A coil block was fabricated using four of the coil elements prepared in Experimental Example 1, with a 21 mm outer diameter, 19 mm inner diameter, 40 mm long steel pipe covered with a 0.3 mm thick mica layer for the hollow core member.

The four component coil elements of the coil block were then electrically connected together in series, after which the coil block thus fabricated was incorporated into a shading coil motor as the stator coil windings thereof, with a fan mounted on the rotary shaft.

An 100 V, 60 Hz electrical potential was applied to the motor, whereupon a current flow of 3.6 A in the coil block was measured. After 1 min of application of the electrical potential, the temperature of the iron plates was 160° C. which was sufficiently cool, and a 100° C. air flow at a rate of 1.1 m³/min was being produced. No audible or palpable vibration was appreciated.

COMPARATIVE EXAMPLE 4

A coil block was fabricated using four of the coil elements prepared in Experimental Example 1, with a 21 mm outer diameter, 19 mm inner diameter, 40 mm long steel pipe covered with a 0.3 mm thick mica for the hollow core member.

The four component coil elements of the coil block were then electrically connected together in series.

Using the coil block thus fabricated, a 100 v, 60 Hz electrical potential was applied thereto, whereupon a current flow of 3.9 A in the coil and a magnetic field intensity of 105 gauss at the hollow core of the coil block were measured. After 1 minute of application of the electrical potential, the temperature of the iron plates was 180° C.

COMPARATIVE EXAMPLE 5

A shading coil motor identical to that of Experimental Example 4 above was constructed, except that in place of the four coil elements from Experimental Example 1, four coil elements from Comparative Example 1 were used. Application of a 100 V, 60 Hz electrical potential resulted only in heat generation with no rotation of the motor shaft occurring and then the coil elements were burned.

EXPERIMENTAL EXAMPLE 5

Extremely thin coils were prepared by regular winding(well-ordered) a 4 m length of the insulated wire used in Experimental Example 1 into two lines, 22 mm internal diameter, 45 mm external diameter coils, the thickness of which was 1 mm.

Five of these coils were then used to fabricate a coil block wherein the coils alternated with 0.5 mm thick, 50 mm by 70 mm iron radiating plates, with a 0.3 mm thick mica layer intervening between each coil and the facing surface of an adjacent radiating plate. At each of the two ends of the coil block, a iron plate identical to those which formed the ends of the coil block prepared in Experimental Example 1 was placed, again with a mica layer intervening between the iron plate and the end surface of the corresponding coil.

Thus assembled, the coil block was bolted together, and was then used to manufacture a hot air blower otherwise identical to that of Experimental Example 4. Driving the motor thus assembled with a 100 V, 60 Hz electrical potential, it was found that a stream of 120° C air was generated at a rate of 1.1 m³/min.

What is claimed is:

1. A heat and magnetic field generating coil element comprising at least two hardened coils aligned in a substantially parallel superimposed relationship, each of said hardened coils consisting of multiple loops of an insulated electrically conductive wire wound so as to form a flattened hollow disk-shaped configuration, said insulated electrically conductive wire having a conductive core with a conductance ratio in a range of 5 to 95%, said coil element further comprising at least one intermediate heat radiating plate fabricated from magnetic material, said intermediate radiating plates provided between each adjacent pair of said at least two hardened coils with a insulating layer interposed between each opposing surface of said intermediate radiating plate and the adjacent surface of a corresponding hardened coil, said coil element further comprising radiating plates fabricated from magnetic material, one of said radiating plates provided at each opposed side of said coil element with a insulating layer interposed between the outer surface of the hardened coil at each opposite side wall of said coil element and the corresponding radiating plate, such that said coil element is tightly held between the radiating plate at one side of said coil element and the radiating plate at the opposed side of said coil element.

2. A heat and magnetic field generating coil element comprising a hardened coil consisting of multiple loops of an insulated electrically conductive wire wound so as to form a flattened hollow disk-shaped configuration, said insulated electrically conductive wire having a conductive core with a conductance ratio in a range of 5 to 95%, said coil element further comprising heat radiating plates fabricated from magnetic material, one of said radiating plates provided at each opposed side of said hardened coil with an insulating layer interposed between each opposed side of said hardened coil and the corresponding radiating plate, such that said hardened coil is tightly held between the radiating plate at one side of said hardened coil and the radiating plate at the opposed side of said hardened coil.

3. A heat and magnetic field generating coil in accordance with claim 2 above, wherein an electrically insulating layer of said insulated electrically conductive wire comprises ceramic material.

4. A heat and magnetic field generating coil element in accordance with claim 2 or 1 above, wherein said insulating layers are comprised of mica.

5. A heat and magnetic field generating coil element in accordance with claim 2 or 1 above, wherein said magnetic material is iron.

6. A heat and magnetic field generating coil element in accordance with claim 2 or 1 above, wherein said magnetic material is silicon steel.

7. A heat and magnetic field generating coil block wherein at least two of the coil elements recited in claim 2 above are aligned in a substantially parallel superimposed relationship, and wherein said at least two coil elements are interconnected by means of a hollow core member which passes through the central portion of said coil elements.

8. A heat and magnetic field generating coil block wherein at least two of the coil elements recited in claim 1 above are aligned in a substantially parallel superimposed relationship, and wherein said at least two coil elements are interconnected by means of a hollow core member which passes through a central portion of said coil elements.

9. A heat generating electric motor incorporating the coil block recited in claim 7 or claim 8 above as stator coil windings of motor.

10. A heat generating electric induction motor incorporating the coil block recited in claim 7 or claim 8 above as stator coil windings of said motor.

11. A hot air blower comprising a fan mounted on a rotating shaft of a heat generating electric motor incorporating the coil block recited in claim 7 or claim 8 above as stator coil windings.

12. A submersible water heater comprising a propeller mounted on a rotating shaft of a heat generating electric motor incorporating the coil block recited in claim 7 or claim 8 above as stator coil windings, such that said electric motor including a proximal portion of said rotating shaft of said electric motor are sealed in a liquid medium tight capsule, and such that said propeller and a distal portion of said rotating shaft lie outside of said capsule and in contact with a liquid medium in which said water heater is submersed.

13. A heat and magnetic field generating tubular coil element comprising a heat radiating pipe fabricated from magnetic material, the outer surface of said heat radiating pipe having an insulating layer applied thereover, over which a hardened coil consisting of multiple loops of an insulated electrically conductive wire is wound, said insulated electrically conductive wire having a conductive core with a conductance ratio in a range of 5 to 95%.

14. A heat and magnetic field generating tubular coil block comprising at least two of the tubular coil elements recited in claim 13 above, such that said tubular coil elements are arranged in a substantially concentric configuration one inside another.

* * * * *